United States Patent
Bittner et al.

(10) Patent No.: US 9,755,477 B2
(45) Date of Patent: Sep. 5, 2017

(54) MAGNETIC MOUNTING WITH FORCE COMPENSATION

(71) Applicant: Siemens Aktiengesellschaft, München (DE)

(72) Inventors: Roland Bittner, Ansbach (DE); Markus Hösle, Erlangen (DE); Hilmar Konrad, Baar (CH)

(73) Assignee: SIEMENS AKTIENGESELLSCHAFT, München (DE)

( * ) Notice: Subject to any disclaimer, the term of this patent is extended or adjusted under 35 U.S.C. 154(b) by 90 days.

(21) Appl. No.: 14/380,559

(22) PCT Filed: Feb. 19, 2013

(86) PCT No.: PCT/EP2013/053244
§ 371 (c)(1),
(2) Date: Aug. 22, 2014

(87) PCT Pub. No.: WO2013/124259
PCT Pub. Date: Aug. 29, 2013

(65) Prior Publication Data
US 2015/0048725 A1    Feb. 19, 2015

(30) Foreign Application Priority Data
Feb. 24, 2012    (DE) .......................... 10 2012 202 842

(51) Int. Cl.
*H02K 7/09*    (2006.01)
*F16C 32/00*    (2006.01)
*F16C 32/04*    (2006.01)

(52) U.S. Cl.
CPC ............. *H02K 7/09* (2013.01); *F16C 32/044* (2013.01); *F16C 32/0444* (2013.01);
(Continued)

(58) Field of Classification Search
CPC ...... H02K 5/1672; H02K 5/1675; H02K 7/09; H02K 2213/09; F16C 32/044;
(Continued)

(56) References Cited

U.S. PATENT DOCUMENTS 3,791,704 A    2/1974 Perper
5,939,813 A    8/1999 Schoeb
(Continued)

FOREIGN PATENT DOCUMENTS

DE    2342767 A1    3/1975
DE    2358527 A1    5/1975
(Continued)

*Primary Examiner* — Joshua Benitez-Rosario
*Assistant Examiner* — Alexander Singh
(74) *Attorney, Agent, or Firm* — Henry M. Feiereisen LLC

(57) ABSTRACT

The aim of the invention is to better compensate for specifiable forces on a magnetic mounting. This is achieved by a magnetic mounting device with a first magnet device (10), which is designed in an annular manner and which has a central axis, for retaining a shaft on the central axis in a rotatable manner by means of magnetic forces. The magnetic mounting device additionally has a second magnet device (12), which is independent of the first magnet device (10), for compensating for a specifiable force acting on the shaft. In this manner, the magnetic mounting device can compensate for the gravitational force or forces based on imbalances.

3 Claims, 3 Drawing Sheets

(52) U.S. Cl.
CPC ...... *F16C 32/0451* (2013.01); *F16C 32/0465* (2013.01); *F16C 32/0474* (2013.01); *H02K 2213/09* (2013.01)

(58) Field of Classification Search
CPC .............. F16C 32/0442; F16C 32/0444; F16C 32/0446; F16C 32/0448; F16C 32/0451; F16C 32/0474; F16C 32/0465; F16C 32/041; F16C 32/0423; F16C 32/0436
USPC .................................................. 310/90, 90.5
See application file for complete search history.

(56) References Cited

U.S. PATENT DOCUMENTS

| | | | |
|---|---|---|---|
| 6,043,580 A | 3/2000 | Schmied | |
| 6,100,618 A | 8/2000 | Hugel | |
| 6,885,121 B2* | 4/2005 | Okada | F16C 32/0444 310/181 |
| 2003/0141773 A1* | 7/2003 | Abel | F16C 32/0444 310/90.5 |
| 2003/0189383 A1* | 10/2003 | Fremerey | F16C 32/0408 310/90.5 |

FOREIGN PATENT DOCUMENTS

| | | |
|---|---|---|
| DE | 9112183 U4 | 2/1992 |
| EP | 2148104 A1 | 1/2010 |
| GB | 1500809 | 8/1975 |
| SU | 17 11 681 A3 | 2/1992 |
| WO | WO 9520260 A1 | 7/1995 |

\* cited by examiner

MAGNETIC MOUNTING WITH FORCE COMPENSATION

CROSS-REFERENCES TO RELATED APPLICATIONS

This application is the U.S. National Stage of International Application No. PCT/EP2013/053244, filed Feb. 19, 2013, which designated the United States and has been published as International Publication No. WO 2013/124259 and which claims the priority of German Patent Application, Serial No. 10 2012 202 842.0, filed Feb. 24, 2012, pursuant to 35 U.S.C. 119(a)-(d).

BACKGROUND OF THE INVENTION

The present invention relates to a magnetic bearing device with a magnet device which is designed to be annular and which has a central axis, for retaining a shaft on the central axis in a rotatable manner by means of magnetic forces.

In conventional, radial magnetic bearings having no permanent magnetic bias, the use of an AC winding to generate a stationary magnetic bias is known. Reference is made here by way of example to the publication DE 23 58 527 A1. The active magnetic bearing presented therein is equipped with a rotary drive comprising stator and rotor with an air gap that is monitored by sensors. A rotating field that is generated by stator windings through the application of alternating current is overlaid with a control field that is generated by windings in the stator through the output currents of amplifiers.

The publication EP 2 148 104 A1 further discloses a magnetic radial bearing having electromagnets disposed in a distributed arrangement in the circumferential direction. The electromagnets each have a common coil for the generation of a magnetic bias and a magnetic, multi-phase rotating field. First and second halves of the coils are each interconnected in a star point. Both star points are provided for connection to a DC power supply for the production of a magnetic bias. The remaining coil ends are provided for parallel connection to a corresponding multi-phase AC controller for the production of a rotating field.

Magnetic bearings serve to bear rotatable shafts. They must also compensate for the gravitational force that acts statically on the shaft. In addition they must also be able to compensate for other specifiable forces, such as e.g. forces generated by imbalances. In order to compensate for these specifiable forces and simultaneously also to center the shaft, the control or regulation element of the magnetic bearing and the coils of the magnetic bearing must have a suitable design.

The publication DE 23 42 767 A1 discloses a generic magnetic bearing device. Here for example an electromagnet is accommodated in a pan-shaped permanent magnet, and the two work together with another permanent magnet suspended above.

The publication WO 95/20260 A1 shows an induction machine with a special winding for the combined generation of a torque and a shear force in same. A similar electric machine with a magnetically mounted rotor is known from the publication DE 91 12 183 U1.

The publication U.S. Pat. No. 3,791,704 A further shows a magnetic bearing in which the permanent magnets are adjustably positioned by means of a screw.

SUMMARY OF THE INVENTION

The object of the present invention is therefore to propose a magnetic bearing device that can be manufactured more economically. In addition an improved method will also be proposed for magnetically bearing a rotatable shaft, with which specified forces acting on the shaft can be compensated for.

The object is achieved according to the invention by a magnetic bearing device including a first magnet device which is designed to be annular and which has a central axis, for retaining a shaft on the central axis in a rotatable manner by means of magnetic forces, a second magnet device that is independent of the first magnet device, for compensating for a specifiable force acting on the shaft, wherein the second magnet device is designed to be annular and is arranged concentrically relative to the first magnet device, wherein the first magnet device has a first coil system and the second magnet device has a second coil system and each coil system has a plurality of pole pairs, and the number of pole pairs of the second coil system is less than the number of pole pairs of the first coil system by a value of precisely one.

The shaft is advantageously mounted with two different magnet devices that are independent of each other. The first magnet device ensures that the shaft is retained on the central axis of the bearing, and the second magnet device is responsible solely for compensating for the specified force acting on the shaft. Separating the responsibilities in this way enables the first magnet device to be designed considerably smaller, since, for example, it does not have to help compensate continuously for the gravitational force. In particular, this also allows the electronics for the magnetic bearing device to be reduced in terms of their sizing.

In an embodiment the second magnet device can have a permanent magnet. This is particularly advantageous if the gravitational force acting on the shaft is to be compensated for, as no electrical power is then required for this compensation, since the required magnetic force is applied by one or more permanent magnets.

In particular a radial spacing of the permanent magnet from the central axis of the first magnet device to compensate for the specifiable force can be regulated by a control device that is integrated in the magnetic bearing device. This would be advantageous for example if the specifiable force can change. The gravitational force to be compensated for changes if for example a mass changes on the shaft or on the bearing, and so a suitable regulation is advantageous. If imbalances occur on the shaft or bearing, it is equally favorable to compensate for those imbalances by means of suitable regulation.

The second magnet device is designed to be annular and is arranged concentrically relative to the first magnet device. This allows specifiable forces in all radial directions to be compensated for.

In particular, the first magnet device has a first coil system and the second magnet device has a second coil system and each coil system has a plurality of pole pairs, and the number of pole pairs of the second coil system is greater or less than the number of pole pairs of the first coil system by a value of precisely one. Consequently two aligned poles (e.g. two north poles; one from the first magnet device and one from the second magnet device) at one side of the magnetic bearing device will amplify each other, and at the opposite side two opposing poles (one north pole and one south pole; one from the first magnet device and one from the second magnet device) will attenuate each other.

As a result a force in the direction of the amplifying poles can be produced selectively.

In addition the magnetic bearing device can have a first converter for actuating the first magnet device and a second converter for actuating the second magnet device. In this way the bearing device can be powered for example by a DC power system of the type that is typically provided in electric or hybrid vehicles.

If the specifiable force is gravitational force, it is advantageous for the second magnet device to have a second control device with which the second magnet device can be regulated to compensate for the gravitational force acting on the shaft. Thus it is no longer necessary for the first magnet device to compensate for gravitational force, with the result that it can be made smaller.

If the specifiable force is caused by an imbalance of or on the shaft or on the bearing, the second magnet device can have a second control device with which the second magnet device can be regulated to compensate for the specified force. It is possible in this way also to compensate for dynamic forces that may act in different radial directions.

BRIEF DESCRIPTION OF THE DRAWING

The present invention is now described in more detail with reference to the appended drawings, in which.

DETAILED DESCRIPTION OF PREFERRED EMBODIMENTS

The exemplary embodiments described in more detail below represent preferred embodiment variants of the present invention.

Figure 1:
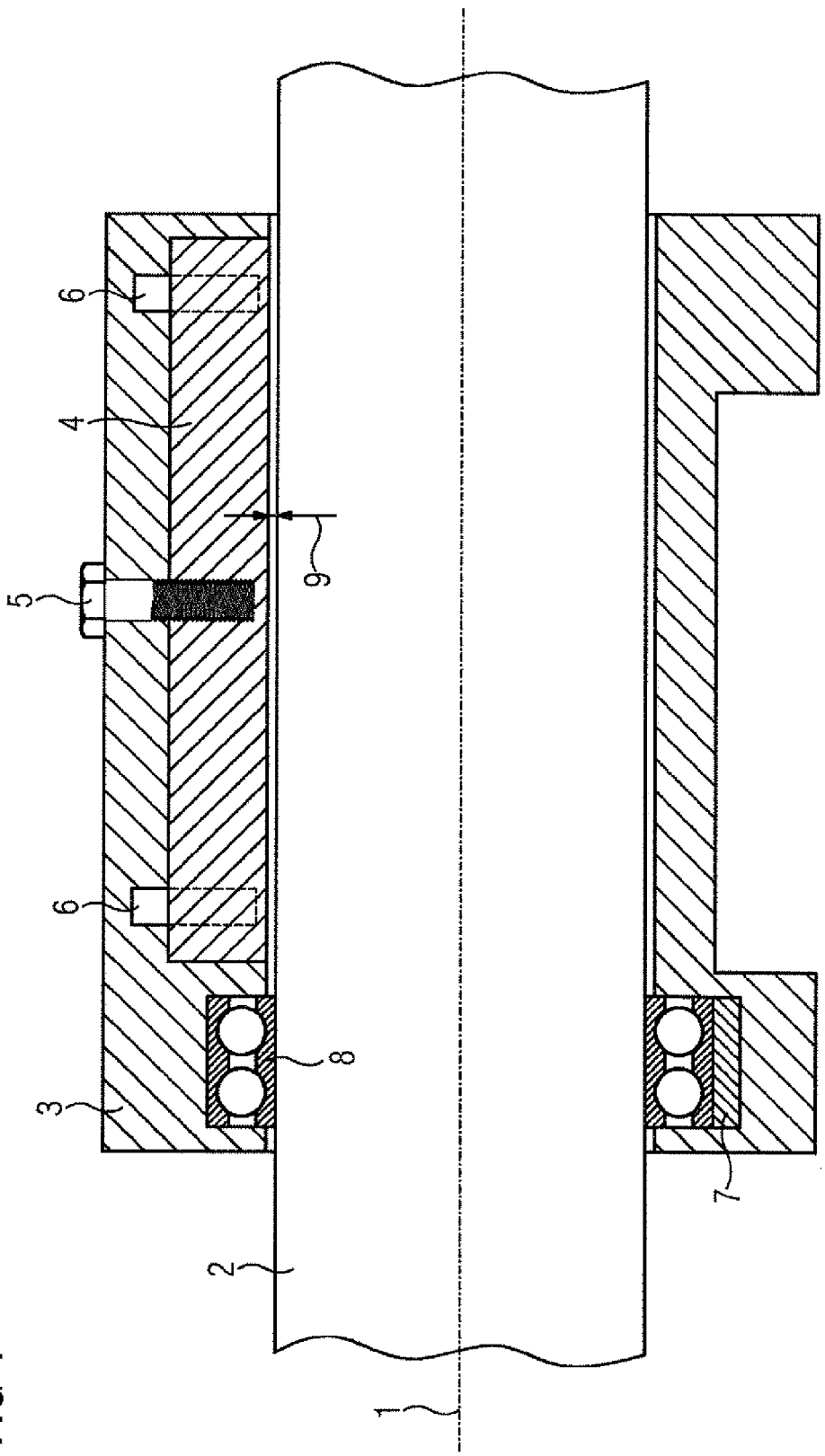
FIG. 1 shows a cross-section through a magnetic bearing with permanent magnets to compensate for gravitational force.

In the example in FIG. 1 a longitudinal section through a magnetic bearing is shown, having a central axis 1 about which a shaft 2 is to be mounted rotatably. Furthermore the magnetic bearing has a housing 3 in which are accommodated magnet devices for mounting. A magnetic bearing of this kind typically has a first magnet device for centering the shaft 2. For the sake of clarity, said first magnet device is not included in FIG. 1. It comprises a coil system having a plurality of coils disposed in a distributed arrangement around the circumference.

Gravitational force acts on the shaft and in FIG. 1 is represented acting in a downward direction. Consequently an additional second magnet device is provided in the magnetic bearing device, in this case within the housing 3, which counteracts the gravitational force. In the example shown in FIG. 1 the second magnet device has a permanent magnet 4. The permanent magnet 4 can consist of a plurality of individual magnets. It has a preferably arc-shaped design, when viewed in the axial direction, with its distance to the shaft 2 expediently being equal at every point.

By means of a central screw 5 the magnetic force acting on the shaft 2 can be set by changing the distance to the shaft. In the event that an electromagnet is used in place of the permanent magnet, the field strength and thus the attractive force can additionally or alternatively be achieved by altering the electric current.

Guide bolts 6 can be provided to the left and right of the screw 5 in order to guide the permanent magnet 4 when its distance from the shaft 2 is being changed. The distance between permanent magnet 4 and shaft 2 can be set for example with the aid of a force-measuring cell 7. In other words, if the magnetic bearing device has a safety bearing 8 as shown in the example in FIG. 1, this safety bearing 8 can abut against the housing 3 through the force-measuring cell 7. The safety bearing 8 can be a loose ball bearing, for example, that mechanically catches the shaft 2 in the event of a failure of the magnetic bearing. If the distance between the permanent magnet 4 and the shaft 2 is now set so as to compensate fully for the gravitational force of the shaft 2, then the force-measuring cell 7 only measures the weight of the safety bearing 8. This allows for optimal setting of the gravitational force compensation by the second magnet device (in this case the permanent magnet 4).

The distance between permanent magnet 4 and shaft 2 can be reduced sufficiently that a rotationally-fixed securing of the shaft 2 is achieved. In this way the magnet 4 can be used as a kind of stop brake. Thus in the case of wind power generators, for example, repair work can be performed more easily.

In an embodiment of the magnetic bearing the magnet, as has already been mentioned, has a curvature that approximately corresponds to an external radius of the shaft 2. In this way the air gap 9 between shaft and magnet can be reduced and the effective force of the magnet can be increased.

In a further embodiment of the magnetic bearing, changing the distance 9 between the magnet 4 and the shaft 2 is automated. Changing the distance can be controlled or regulated. A control variable is for example the force measured by the force-measuring cell 7. Regulation is possible on the basis of this force, with a maximum value and a minimum value of the force advantageously being stipulated. In a control loop for force regulation, in which the distance of the magnet to the shaft represents a controlled variable, a minimum value of the controlled variable can be stipulated below which it is not permitted to fall.

If the shaft 2 is made of a nonmagnetic material, the shaft can be fitted with a magnetic ring casing (sleeve). This can also be embodied as a laminate in order to minimize eddy current losses. To minimize eddy current losses a magnetically soft shaft can also be fitted with a corresponding sleeve.

The bearing shown in FIG. 1 can also be a mechanical bearing with magnetic compensation unit, which is not claimed here. In this case the bearing 8 shown in FIG. 1 would be a conventional antifriction bearing (e.g. ball bearing or roller bearing) and provision for a first magnet device to center the shaft would not be required. Even with a simple stationary magnetic field of the second magnet device (permanent magnet 2), which reduces the weight load acting on the bearing, a longer operating life of the bearing can thus be achieved by reducing the load thereon. This can be advantageous in particular if the replacement of bearings is very difficult and cost-intensive (e.g. offshore wind farms).

Figure 2:
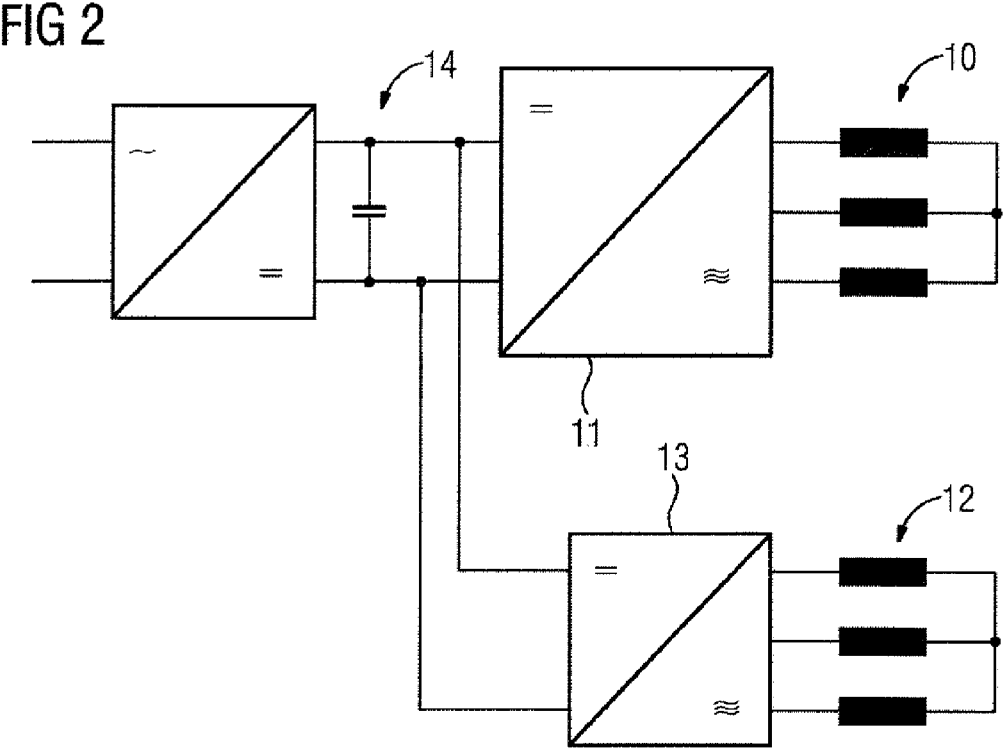
FIG. 2 shows a converter circuit for operating a magnetic bearing device with two coil systems.
Figure 3:
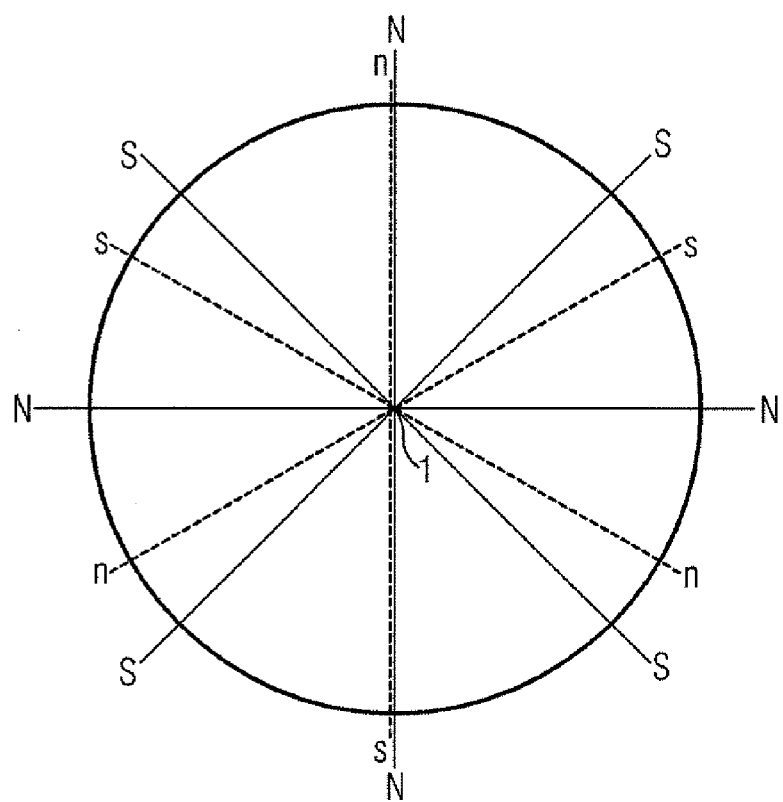
FIG. 3 shows an arrangement of magnetic fields in a magnetic bearing according to the invention.
Figure 4:
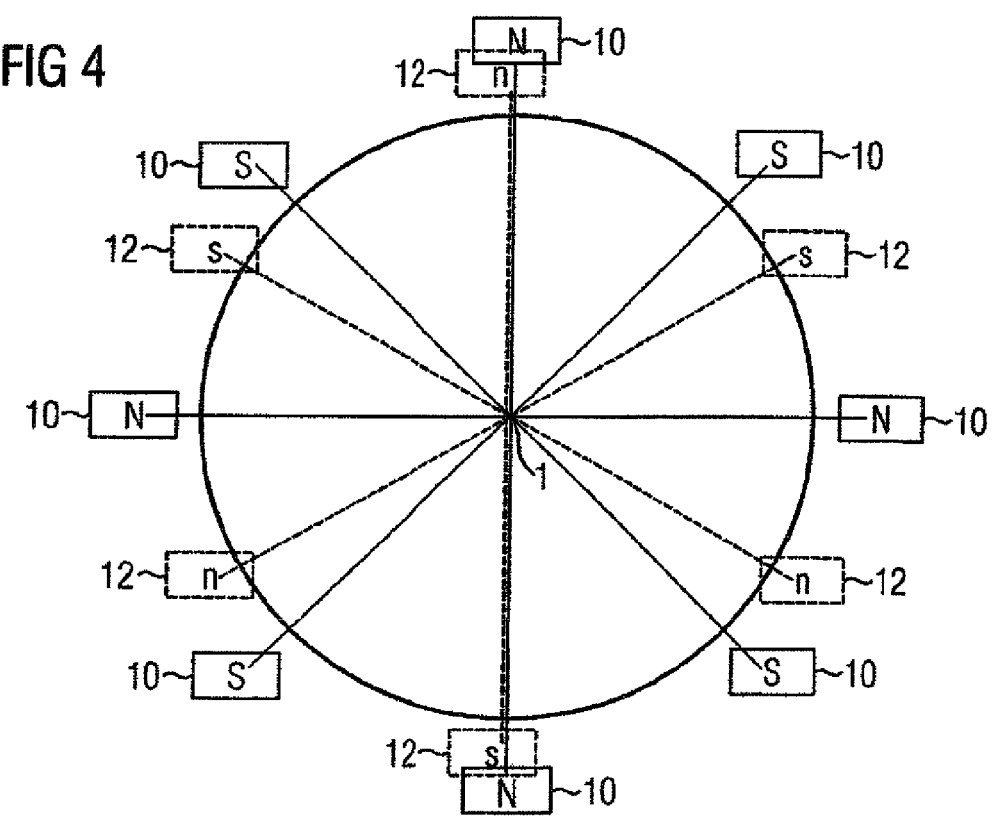
FIG. 4 shows an arrangement of magnetic fields in a magnetic bearing with two coil systems according to the invention.

With the aid of FIG. 2 and FIG. 3 an exemplary embodiment of the magnetic bearing device according to the invention is now described, in which the second magnet device has electromagnets in order to compensate for a specifiable force on the shaft (e.g. gravitational force or forces caused by imbalances). The circuit in FIG. 2 shows a potential circuit-engineering structure of such a magnetic bearing device. For centering the shaft (not shown in FIG. 2) the device has for example a three-phase coil system 10. A converter 11 supplies this first coil system 10. Here the converter 11 also has a control or regulation element to regulate the currents through the first coil system 10 such that the specifiable force acting on the shaft is compensated for by the magnetic field of the coil system 10. A possible control loop, in which for example a force acting on the shaft 2 or an offset of the shaft relative to the central axis 1 is measured, is not included in FIG. 2.

The magnetic bearing device also has a second magnet device comprising a second coil system 12. The two coil systems 10 and 12 are independent of each other, and the second coil system 12 is additionally actuated here by a separate converter 13. Here too this converter 13 generates a three-phase current for the three-phase coil system 12.

In the present example both converters 11 and 13 are supplied with power via an intermediate circuit 14. The intermediate circuit 14 is in turn supplied by a rectifier that rectifies for example a single-phase alternating current.

The second converter 13 can also have a regulating element with which it is possible to regulate the magnetic compensation forces caused by the second coil system, as a function of different measured variables. Thus for detection purposes an imbalance, an acceleration or for example a deflection of the shaft can be measured and fed to a controller that is integrated in the converter 13.

The controller in the second converter 13 can have a lower control precision than the controller in the first converter 11, as the latter must ensure precise central positioning of the rotor.

The circuit in FIG. 2 now enables a magnetic field to be realized that is indicated symbolically in FIG. 3. It should be noted here that the first magnet device with the first coil system 10 and the second magnet device with the second coil system 12 are each annular and are arranged concentrically. Consequently the magnetic fields of both magnet devices overlap each other in the manner represented in FIG. 3.

The example of FIG. 3 relates to a first magnet device with an eight-pole winding. In other words, the coil system 10 has eight poles distributed around its circumference and thus a number of pole pairs p=4. By contrast the second magnet device has a six-pole winding. In other words, the second coil system 12 has six poles distributed around its circumference and thus a number of pole pairs p=3. In FIG. 3 the eight poles of the first coil system, which is responsible for centering the shaft, are represented by the capital letters N and S. The six poles of the second coil system 12 that are distributed around the circumference are represented by the letters n and s. The poles of the two coil systems overlap at the twelve o'clock position and also at the six o'clock position. If the two coil systems 10 and 12 are now supplied with current in order to obtain the magnetic poles represented in FIG. 3, the magnetic fields in the upper half of the annular magnet arrangement are amplified since the north poles N, n and south poles S, s respectively are very close to one another. Conversely in the lower half of the magnet arrangement the south pole S, s and north pole N, n are very close to one another. This results in an attenuation of the respective magnetic field. At the point in time at which the magnet constellation is as shown in FIG. 3, the shaft extending through the interior of the magnetic bearing device would be pulled upward. This could serve to compensate for the gravitational force. However a magnet constellation of this type can also be rotated dynamically in the most diverse range of directions so that for example an imbalance can be leveled out thereby.

If an imbalance is detected during the operation of a rotation body (shaft, possibly with parts fitted thereto), said imbalance can be compensated for by means of the magnetic bearing device described. In principle, instead of the second coil arrangement 12 as indicated above, a permanent magnet 4 can also be utilized whose air gap from the rotation body can be altered on a regulated basis.

In a further embodiment of the invention the magnet can be utilized to excite or attenuate a vibration, for example for test purposes.

The invention claimed is:

1. A magnetic bearing device, comprising:
    an annular first magnet device defining a central axis and configured to rotatably retain and center a shaft on the central axis by magnetic forces;
    an annular second magnet device arranged independently of the first magnet device in concentric relationship to the first magnet device and configured to compensate for a specifiable force acting on the shaft and to counteract a gravitational force, wherein only the second magnet device has a permanent magnet, said permanent magnet being composed of a plurality of individual magnets and having an arc-shaped design when viewed in an axial direction, said permanent magnet being spaced radially from the central axis of the first magnet device by an adjustable spacing between the second magnet device and central axis to compensate for the specifiable force, spacing is adjusted by a screw and further comprising a first control device integrated in the magnetic bearing device and configured to regulate the spacing, and
    a first converter configured to actuate the first magnet device, and a second converter configured to actuate the second magnet device,
    wherein the first magnet device has a first coil system with a plurality of pole pairs, and the second magnet device has a second coil system with a plurality of pole pairs which is less than the number of pole pairs of the first coil system by a value of precisely one.

2. The magnetic bearing device of claim 1, wherein the specifiable force is the gravitational force, said second magnet device having a second control device configured to regulate the second magnet device to compensate for the gravitational force acting on the shaft.

3. The magnetic bearing device of claim 1, wherein the specifiable force is caused by an imbalance of or on the shaft, said second magnet device having a second control device configured to regulate the second magnet device to compensate for the specifiable force.

* * * * *